Pyne & Barr,
Egg-Beater,
N° 26,123. Patented Nov. 15, 1859.

Attest:
Chas. E Bombaugh
Henry L Beader

Inventors:
John Pyne
Washington Barr

UNITED STATES PATENT OFFICE.

JOHN PYNE AND WASHINGTON BARR, OF HARRISBURG, PENNSYLVANIA.

EGG-BEATER OR ICE-CREAM FREEZER.

Specification of Letters Patent No. 26,123, dated November 15, 1859.

*To all whom it may concern:*

Be it known that we, JOHN PYNE and WASHINGTON BARR, of Harrisburg, county of Dauphin, and State of Pennsylvania, have invented a new Improvement in the Manner of Beating Eggs and Manufacturing Ice-Cream; and we do hereby declare that the following is a full and exact description thereof, reference being had to the accompanying drawings and to the letters of reference marked thereon.

The nature of our invention or improvement consists in making an egg beater and ice cream freezer the outer plate or surface of which is plain, and the bottom having projecting, corrugated and perforated circles in which the dasher revolves.

To enable those skilled in the art to manufacture and use our invention or improvement we will proceed to describe its construction.

Figure 1:
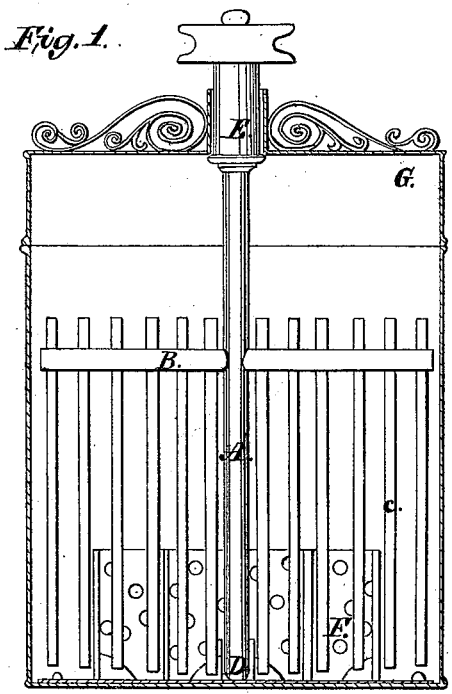
Figure 2:
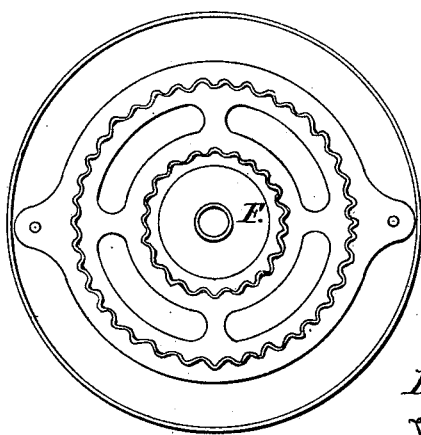

In the drawing Figure 1 represents the machine with part of the outer lining off, showing its interior; Fig. 2, the section draft of the corrugated, perforated circles on the bottom.

A, is the dasher consisting of shaft $a$, cross piece $b$, and wires $c$. The dasher shaft $a$ fits into a seat in the bottom and runs through a journal in the top or cover, E, as shown in the drawings. The dasher is revolved in any of the known ways, by crank, bur, screw, thread or spring. The bottom D, has a series of corrugated, perforated circles projecting one or more inches through which the wires of the dasher run or revolve, for the purpose of more rapidly and effectually accomplishing the object desired. The top or cover G, has a hole in it for the purpose of emptying the can, inserting the material to be operated upon or the admission of air.

The can or outer lining Fig. 1, is plain as shown in the drawings, and can be made of wood, tin or metal of the usual form.

What we claim as new and desire to secure by Letters Patent of the United States is:—

An ice cream freezer or egg beater, the bottom having corrugated perforated circles, in which the shaft and wires of the dasher revolve, as and for the purposes above set forth and described.

JOHN PYNE.
WASHINGTON BARR.

Witnesses:
HENRY BEADER,
CHAS. C. BOMBAUGH.